(12) United States Patent
Auerbach (10) Patent No.: US 10,271,606 B2
(45) Date of Patent: Apr. 30, 2019

(54) PROTECTIVE HELMET

(71) Applicant: Pfanner Schutzbekleidung GmbH, Koblach (AT)

(72) Inventor: Philipp Auerbach, Niederteufen (CH)

(73) Assignee: PFANNER SCHUTZBEKLEIDUNG GMBH, Koblach (AT)

( * ) Notice: Subject to any disclaimer, the term of this patent is extended or adjusted under 35 U.S.C. 154(b) by 0 days.

(21) Appl. No.: 15/572,897

(22) PCT Filed: May 10, 2016

(86) PCT No.: PCT/EP2016/060435
§ 371 (c)(1),
(2) Date: Nov. 9, 2017

(87) PCT Pub. No.: WO2016/180824
PCT Pub. Date: Nov. 17, 2016

(65) Prior Publication Data
US 2018/0287648 A1 Oct. 4, 2018

(30) Foreign Application Priority Data

May 11, 2015 (DE) .......................... 10 2015 006 111

(51) Int. Cl.
*A42B 3/12* (2006.01)
*A42B 3/30* (2006.01)
(Continued)

(52) U.S. Cl.
CPC ................ *A42B 3/30* (2013.01); *G10K 11/18* (2013.01); *H04B 1/385* (2013.01); *A42B 3/125* (2013.01);
(Continued)

(58) Field of Classification Search
CPC .. A42B 3/30; A42B 3/303; A42B 3/12; A42B 3/125; G10K 11/18; G10K 11/26;
(Continued)

(56) References Cited

U.S. PATENT DOCUMENTS 3,787,641 A * 1/1974 Santori .................... A42B 3/30
381/151
4,833,726 A * 5/1989 Shinoda ................... A42B 3/30
381/376
(Continued)

FOREIGN PATENT DOCUMENTS

DE 202004008860 U1 8/2004
EP 0412205 A1 2/1991
(Continued)

OTHER PUBLICATIONS

Office Action dated Dec. 18, 2015 by the German Patent Office in priority application DE 10 2015 006 111.9, partial machine translation provided.
(Continued)

*Primary Examiner* — Jesse A Elbin
(74) *Attorney, Agent, or Firm* — Hassan Abbas Shakir; Shakir Law PLLC (57) ABSTRACT

A protective helmet includes a microphone and an electronic device for improving communication with the environment. The microphone is arranged on a supporting cage below a shell of the helmet and captures the sound waves that are generated by an organ of speech of the wearer of the helmet and propagate the sound waves in the area of the supporting cage.

14 Claims, 8 Drawing Sheets

(51) Int. Cl.
  *G10K 11/18* (2006.01)
  *G10K 11/26* (2006.01)
  *G10K 11/28* (2006.01)
  *G10K 11/30* (2006.01)
  *H04B 1/3827* (2015.01)

(52) U.S. Cl.
  CPC .............. *A42B 3/303* (2013.01); *G10K 11/26* (2013.01); *G10K 11/28* (2013.01); *G10K 11/30* (2013.01); *H04B 2001/3866* (2013.01); *H04R 2460/13* (2013.01)

(58) Field of Classification Search
  CPC ........ G10K 11/30; G10K 11/28; H04B 1/385; H04B 2001/3866; H04R 2460/13
  USPC ......................................................... 381/151
  See application file for complete search history.

(56) References Cited

U.S. PATENT DOCUMENTS

| | | | |
|---|---|---|---|
| 6,104,816 A | 8/2000 | Downs, Jr. et al. | |
| 8,194,875 B2* | 6/2012 | Miranda | A42B 3/14 381/151 |
| 8,325,963 B2* | 12/2012 | Kimura | H04R 1/1008 381/151 |
| 8,706,043 B2* | 4/2014 | Glezerman | A42B 3/30 455/575.2 |
| 2010/0223706 A1 | 9/2010 | Becker et al. | |
| 2012/0084084 A1 | 4/2012 | Zhu et al. | |

FOREIGN PATENT DOCUMENTS

| | | |
|---|---|---|
| EP | 0519621 A1 | 12/1992 |
| EP | 0618751 A1 | 10/1994 |
| JP | 2004173018 A | 6/2004 |

OTHER PUBLICATIONS

International Search Report dated Aug. 1, 2016 by the European Patent Office in related application PCT/EP2016/060435, translation provided.

Written Opinion dated Nov. 17, 2016 issued by the European Patent Office in related application PCT/EP2016/060435.

* cited by examiner

PROTECTIVE HELMET

BACKGROUND OF THE INVENTION

1. Field of the Invention

The invention relates to a protective helmet. More particularly, the invention relates to a protective helmet having a microphone and an electronic device for improving communication.

2. Discussion of the Related Art

Protective helmets substantially consist of a hard helmet shell for absorbing a blow or an impact and for redirecting the direction of an impact, as well as a supporting cage for absorbing the kinetic impact energy transmitted to the interior in case of such a blow or impact and for improving the wearing comfort. Further, for example, a hearing protector enabling a reduction of the ambient noise may be disposed on both sides of the helmet shell. In addition, a face protection, for example in the form of a grating or of a plastic pane, may be provided on such a helmet. Protective helmets are often used in loud surroundings, for example for forest or construction work. In these environments, communicating with other persons is difficult due to the ambient noise. Particularly in case of sawing work, forest work in extensive areas or on construction sites in spacious and/or multi-storeyed buildings, it is helpful when communicating with colleagues is possible without visual contact and out of earshot to, for example, give or capture instructions, shout warnings, or exchange information.

SUMMARY OF THE INVENTION

It is an object of the invention to provide a protective helmet which improves communication between the wearer of the helmet and other persons.

Said object is solved by the features of the independent claim. Advantageous embodiments of the invention are described in the dependent claims.

The invention relates to a protective helmet comprising a helmet shell, a fitting space in which an electronic device for communicating is disposed, a supporting cage disposed in an interior of the helmet shell, and a microphone which is disposed in or on the supporting cage and provided with a sensor for electronically capturing sound waves, the microphone comprising a sound receiver for capturing and transmitting the sound waves to the sensor, the sound receiver being capable of capturing the sound waves generated by an organ of speech of the wearer of the helmet and propagating above the head of the wearer of the helmet, the microphone being connected to the electronic device via a signal connection to transmit the captured sound waves to the electronic device as a signal. Incidentally, the fitting space is preferably disposed on the helmet shell. The protective helmet according to the invention renders it easier for a wearer of the helmet to transmit the spoken word to other persons even in noisy environments, for example by transmitting the signals to other devices by radio. When the person wearing the helmet is speaking sound waves propagate along the cranial bones and thus do not only emerge from the mouth but are also transmitted at other positions of the head. A major part of the sound waves propagates above the head in the process, particularly, for example, above the spine at the point of intersection where the coronal bone and the parietal bone meet. The microphone is preferably disposed in this position to obtain an optimum capturing of the sound waves. For the attachment to the supporting cage, a detachable connection, particularly a hook-and-loop connection, is provided so that the microphone can simply be retrofit to the supporting cage and detached from von the supporting cage again when required. For fastening the microphone to the supporting cage, also, an adhesive connection may be provided. The connection used for fastening may also serve to absorb other sound waves so that these are not captured by the microphone. To obtain an excellent absorption of the structure-borne sound waves transmitted by the supporting cage, advantageously, a particularly loose hook-and-loop connection is used. The helmet shell preferably consists of a hard plastic material to guarantee a good protection of the wearer of the helmet. The helmet shell may, in addition, be provided with ventilation slots to render an aeration of the head of the wearer of the helmet possible and to increase the wearing comfort in this way. The supporting cage comprises support ribs for the abutment on the head which are disposed in a distance from the helmet shell so that a blow hitting the helmet shell will not be directly transmitted to the head surface through the helmet shell. At the same time, the supporting cage preferably consists of a soft material, particularly of an elastomer, to further suppress the impact energy and to improve the wearing comfort. The sound receiver of the microphone preferably has an elliptic, particularly a circular cross section, the sound receiver having a surface facing the head which is larger than a surface of the sensor facing the head. In this way, the sensor may preferably be designed so as to be comparatively small, because the sound receiver is advantageously capable of capturing a major part of the sound waves propagating above the head. Since the sound receiver is preferably rigidly connected to the sensor the thus stimulated vibrations of the sound receiver are conveyed to the sensor and captured there.

The cross section of the sensor may be an angular in shape, however, it may also be round. In addition, the microphone is always located in an ideal position for capturing the sound waves due to the arrangement on the supporting cage and above the head. Unlike with microphones disposed in front of the mouth of the person and held there, in particular, by an elongated arm which can, however, easily be caused to vibrate, no interfering vibrations, particularly no relative movement between the microphone and the head due to a movement of the head will occur. The signal connection between the microphone and the electronic device may be an electric connection or a radio connection. In case of the electric connection, preferably an electric cable is disposed between the microphone, particularly the sensor, and the electronic device, the electric cable advisably being shielded from other sources of sound so that no interfering noise is transmitted to the microphone via the electric cable.

Preferably, it is contemplated that the sensor is a piezoelectric sensor. A piezoelectric sensor advantageously renders an extremely low installation height of the microphone possible so that it may be comfortably worn. Alternatively, the sensor may also be a piezo-resistive, a capacitive, an electromagnetic, an electrodynamic or an electrostatic sensor.

Furthermore, the protective helmet may be further developed in that the sound receiver is formed so as to be funnel-shaped and in that the sensor is disposed in a central area of the funnel-shaped sound receiver. By disposing the sensor in the central area, the sound waves emanating from the head are advantageously uniformly transmitted to the sensor. Due to the fact that the sound receiver is funnel-shaped, particularly that it has a surface which is complementary to the head, the sound waves can be captured without interferences.

The protective helmet may, in addition, advantageously be formed so that the sound receiver has a concave curvature facing the head surface of the head. The concave curvature may, for example, be a paraboloid. Owing to the parabolic sound receiver formed in this way a particularly broad frequency spectrum of the sound waves can be captured. In addition, interfering sound waves entering from other directions than the opening direction of the parabolic sound receiver have a less intense influence on the vibration of the sound receiver.

It may be further contemplated that the microphone comprises a structure-borne sound absorber for suppressing structure-borne sound waves transmitted via the supporting cage. In this case, the structure-borne sound absorber preferably fully encloses the microphone with the exception of the sound receiver towards the outside, the structure-borne sound absorber preferably having a pot or cup shape. Incidentally, the remaining components of the microphone are disposed inside the structure-borne sound absorber. However, the structure-borne sound absorber may also, at least partly, absorb air-borne sound waves without transmitting them to the sensor or the sound receiver, or at least suppress them. The structure-borne sound absorber may also have blow- and/or impact-suppressing features.

In a preferred embodiment of the protective helmet it is contemplated that the structure-borne sound absorber comprises an elastomer. Elastomers have a, for solid bodies, high elasticity. For this reason, they are well suited for the absorption and/or suppression of structure-borne sound waves which are transmitted to the microphone, for example, via the supporting cage.

Incidentally, it may particularly be contemplated that the elastomer is rubber. Rubber is readily available and can be processed at low costs, but still has excellent sound absorption properties.

Furthermore, the protective helmet may be further developed in that only the structure-borne sound absorber physically connects the microphone directly to the supporting cage. In this way, structure-borne sound waves are prevented from being captured by other components of the microphone and transmitted to the sensor where these structure-borne sound waves which are particularly generated at points of attachment and cause interfering noise due to friction between helmet shell and components arranged on the helmet shell occurring there. Other potentially interfering sources of sound acoustically separated from the sensor by this arrangement are, for example, loudspeakers disposed on the protective helmet.

In a preferred embodiment it is contemplated that the structure-borne sound absorber comprises a contact surface provided for the abutment of the microphone on the head. In this way, advantageously, a chamber which is air-tight towards the outside is formed in the interior of the microphone in which the remaining components can be arranged. The structure-borne sound absorber which is, for example, formed as a cylinder, may, on its outside, be inserted into a circular, i.e. complementarily formed opening in the supporting cage and absorb the interfering, structure-borne sound waves transmitted by the supporting cage in this way.

In particular, it may be contemplated that the structure-borne sound absorber is designed so as to be cup-shaped and has an opening side facing the head, the contact surface enclosing the opening side, and the sound receiver being disposed in an interior of the structure-borne sound absorber at the opening side. In this way, it is advantageously ensured that the entire microphone, with the exception of the sound receiver disposed on the opening side, is subjected to sound absorption. Opposite of the opening side an upper front wall advantageously suitable for an abutment and fastening to the supporting cage is formed owing to the cup shape.

Advantageously, the protective helmet is improved in that a pad is disposed on the supporting cage between the supporting cage and the head and in that the pad extends at least around the contact surface of the microphone on the head. The pad thus advantageously serves to not only cushion the supporting cage but also to insulate the connecting area between the contact surface of the microphone and the head surface in a sound-proof manner. It may also be contemplated that the pad extends between the contact surface of the microphone and the head. It is particularly advantageous that the pad serves to enclose existing head hair which may have varying densities due to strands of hair in an air-tight manner so that an airtight contact between the microphone and the head surface is established. Further, the pad serves for cushioning and therefore improves the wearing comfort of the protective helmet.

Furthermore, the protective helmet may be further developed in that the microphone comprises an airborne sound absorber for suppressing air-borne sound waves transmitted to the microphone through the air. It may be that not all sound waves are absorbed by the structure-borne sound absorber. With an airborne sound absorber which, for example, comprises an extremely soft and particularly lightweight material and may furthermore have a high porosity particularly air-borne sound waves, i.e. sound waves transmitted to the microphone through the air, can be absorbed. The airborne sound absorber does preferably not only absorb air-borne sound waves but also structure-borne sound waves. The airborne sound absorber may also have blow- and/or impact-suppressing properties.

Furthermore, the airborne sound absorber may, in particular, be further developed in that the airborne sound absorber comprises foamed material. Foamed material can be easily produced and formed, has excellent sound absorption properties, and is therefore an ideal material for an airborne sound absorber. The pore sizes of the foamed material are advantageously within the wave length spectrum of the sound waves to be absorbed here.

In addition to this or alternatively it may be contemplated that the airborne sound absorber comprises a support surface for the sound receiver formed so as to be complementary to the sound receiver. Owing to the abutment of the sound receiver on the support surface specific frequency ranges and undesired vibrations of the sound receiver can be suppressed. Further, a free vibration of the sound receiver in the microphone, for example due to blows, is advantageously prevented thereby.

The protective helmet may, in addition, be suitably formed so that the signal connection is an electric line. An electric line is advantageous as compared to a radio connection in that it doesn't require any additional transmitters and receivers and can be manufactured at low costs. The electric line is, at least in sections, formed as a cable and preferably comprises a copper line within a rubber layer, wherein the cable may, in addition, be surrounded by an attenuator. It may be contemplated that the electric line extends along an inner surface of the helmet shell and is guided there, guiding means, for example eyes or clips, being provided for guiding the electric line. The line may also be glued in place. In particular, the electric line may be connected to the electronic device by means of a plug connection, preferably a cinch connection being provided. If the fitting space is movably disposed on an outer surface of the helmet shell it may be contemplated that the electric line is, in sections, formed by a sliding contact or an elastic cable to be capable of following the movement.

A preferred further development of the embodiment comprising the electric line and the airborne sound absorber provides for the electric line extending, at least in sections, helically in the airborne sound absorber. In this way, an extensive abutment of the electric line on the airborne sound absorber is effected so that the structure-borne sound waves transmitted by the electric line are advantageously suppressed. In particular, a guidance in the airborne sound absorber comprising at least one complete winding of the spiral is selected so that structure-borne sound waves reflected in the electric conductor are suppressed.

Here, in particular, it may be contemplated that the sound receiver comprises a cable channel and that the electric line is, at least in sections, guided in the cable channel. In this way the electric line is prevented from vibrating freely in the end section before reaching the sensor. The electric line is particularly prevented from vibrating at another frequency than the sound receiver in this way which would make it cause severe interferences in the sensor.

The sound receiver may, in particularly preferable manner, be formed so that the cable channel extends helically in the sound receiver. In this way, an extensive contact area between the sound receiver and the electric line is formed in the cable channel so that the transmitted structure-borne sound waves have a less intense influence on the amplitude of the sound receiver. In particular, an asymmetric sound transmission to the sound receiver can be prevented or at least reduced in this way. The cable channel may extend on the side of the sound receiver on which the sound receiver abuts on the support surface of the airborne sound absorber so that vibrations of the electric line are suppressed even more effectively.

The protective helmet may, furthermore, be further developed in that the fitting space is disposed on the outside of the helmet shell and enclosed by a housing. In this way, the interior of the protective helmet may advantageously be surrounded only by the helmet shell so that no components possibly breaking loose due to a blow move uncontrolledly inside the protective helmet. In addition, usefully, a protection for the loudspeaker device and the electronic device is formed by the housing.

The protective helmet may, in a particularly preferred manner, be formed so that, further, a helmet shell attachment connected to the helmet shell from the outside is provided which forms at least part of the housing. The helmet shell attachment may be subsequently connected to the helmet shell so that the loudspeaker device and the electronic device may either be attached to the helmet shell together with the helmet shell attachment or are already attached to the helmet shell and are readily accessible owing to the detachable helmet shell attachment, for example to exchange a battery. The helmet shell attachment may comprise a connecting wall and be attached to the helmet shell by means of the connecting wall. Further, the housing may include the connecting wall of the helmet shell attachment and the helmet shell, the connecting wall advantageously being movably arranged on the remaining helmet shell attachment and also being fixable there. In addition, it may, in particular, be contemplated that the connecting wall delimits the fitting space towards the helmet shell. In addition to this, it may be contemplated that the connecting wall of the helmet shell attachment and the helmet shell together comprise means for fastening the helmet shell attachment on the helmet shell. The means for fastening may comprise a plug connection for a non-positive connection and/or a catch connection for a positive connection. In a preferred embodiment, the helmet shell attachment may also open and close ventilation slots formed in the helmet shell of the protective helmet by being shifted in a retainer provided on the helmet shell.

It may further be contemplated that the electronic device comprises a circuit board, a signal processing unit, a voltage source, a signal receiver, a signal transmitter and/or a signal amplifier. The circuit board renders the establishment of an organised connection to the electronic components of the electronic device as well as the loudspeaker device possible in a simple manner. To process signals originating from the microphone or the signal receiver, a signal processing unit, for example in the form of a microchip or a processor, may be provided. Further, the incoming signals may be adapted to the signal intensity processed by the signal processing unit by a signal amplifier, for example a pre-amplifier. The signal receiver and the signal transmitter are, for example, radio receivers and radio transmitters for communicating with the surroundings through electromagnetic signals. They may, however, also be infrared receiver and infrared transmitter. In particular, they may be transmitters and receivers suitable for a mobile network or radio transmissions or transmitters and receivers capable of handling Bluetooth or W-Fi. In this way, the protective helmet may, for example, be used to telephone with other persons, capture radio broadcasts, or to communicate with a mobile telephone, particularly a smartphone. In particular, the protective helmet may establish a wireless data connection to a mobile telephone and thereby, for example, serve as a headset. The protective helmet may also be operated by an app of the mobile telephone, the app being capable of turning the electronic device of the protective helmet on and off, of making adjustments relating to the volume, or the sensitivity of the microphone, or a radio frequency, or of adapting the electronic device to specific environments. In this connection, previously set profiles for volume, sensitivity of the microphone, and frequency profiles may be accessed by the app and transmitted to the electronic device or retrieved from a memory of the electronic device based on a signal from the app.

In an advantageous further development of the protective helmet it is contemplated that a loudspeaker device for generating air-borne sound waves is disposed in the fitting space which comprises at least a first loudspeaker, a hearing protector being attached to the helmet shell, and that an acoustic line is provided between the hearing protector and the loudspeaker device to guide the air-borne sound waves generated by the loudspeaker to the acoustic output in the hearing protector. In this way, a protective helmet is provided which combines a loudspeaker device and an acoustic output so that, in particular, no additional tubes or other acoustic lines have to be brought up to the protective helmet from the outside to communicate with the wearer of the helmet. In addition, no electric connections to the hearing protector are required to supply loudspeakers potentially provided there. An existing hearing protector may advantageously be reused almost as it is, only minor structural adaptations of the hearing protector being required, for example a hole for the acoustic line. Further, it is, in this way, advantageously possible that a person wearing the protective helmet can be reached from the outside even when he or she wears the hearing protector. In particular, it may be contemplated that the electronic device is electronically connected to the loudspeaker device and transmits electronic signals to be converted into air-borne sound waves to the loudspeaker unit. In this way, for example, the wearer of the helmet can be communicated with via a radio connection. The hearing protector may be formed so as to be detachable from the helmet shell. The hearing protector may also be designed so as to be foldable to the backside. The acoustic line may, for example, be a soft silicone tube which, particularly, has a continuous internal cross section so that it can be folded into the desired position while, at the same time, the maximum possible laminar flow prevails in the acoustic line. The acoustic line will, in this way, be lead through a passage, for example a hole in the hearing cavities of the hearing protection, and may thus be used to acoustically output air-borne sound waves. In an advantageous further development it is contemplated that a main emanating direction of the sound waves generated by the loudspeaker device is directed away from the head to be protected. In this way, no sound waves or only a small proportion of the sound waves generated by the loudspeaker device are translated into structure-borne sound waves so that an irritation of the wearer of the helmet is avoided. Particularly, any feedback of the microphone disposed on the supporting cage is avoided in this way. Further, the structure-borne sound absorption of the structure-borne sound waves originating from the loudspeaker device will also become easier. The loudspeaker may comprise one or two membranes.

Furthermore, the loudspeaker device may be designed so that the loudspeaker device comprises a second loudspeaker and that the two loudspeakers are separated from each other by an intermediate space. In this way, each of the two hearing protection cavities of the hearing protection may be filled with sound in a simple manner. Mutual interferences are avoided or reduced by the intermediate space. The intermediate space may accommodate an acoustic attenuation to further reduce the interferences. For example, the electronic device may be accommodated in the intermediate space.

Advantageously, it is contemplated that each loudspeaker of the loudspeaker device comprises a membrane the surface normal of which extends in parallel with a respective tangent of a head surface of the head so that the main emanating direction of the sound waves generated by the loudspeakers is directed away from the head. In this way, no sound waves or only a small proportion of the sound waves generated by the loudspeaker device are converted into structure-borne sound waves so that an irritation of the wearer of the helmet is avoided.

In addition to this, or alternatively, it may be contemplated that each loudspeaker of the loudspeaker device comprises a membrane the surface normal of which extends outside of a space occupied by the microphone. In this way, any feedback by the microphone arranged on the supporting cage is advantageously avoided or reduced as only a small proportion of the output sound waves is emitted in the direction of the microphone. Furthermore, also the structure-borne sound absorption of the structure-borne sound waves originating from the loudspeaker device will be facilitated.

Preferably, it is contemplated that each loudspeaker of the loudspeaker device is provided with a membrane which divides the respective loudspeakers into a first chamber and a second chamber and seals these chambers in an airtight manner with respect to each other so that an acoustic feedback will be avoided. The membrane may be one of the membranes described above.

The loudspeakers may be designed so that the first chamber comprises an outlet for the acoustic line, the second chamber being hermetically sealed. In this way, it may be advantageously avoided that the communication directed to the person wearing the helmet is perceivable to the outside world. The rear second chamber is, in this case, respectively designed so as to be as large as possible, and it may occupy a multiple of the space of the first chamber comprising the acoustic outlet in the fitting space. In this way, the air-borne sound waves generated by the membrane on the rear side are well dissipated, and a feedback between the chambers separated by a membrane is advantageously avoided.

BRIEF DESCRIPTION OF THE DRAWINGS

The features of the invention are disclosed with respect to the following drawings.

In the following description of the drawings the same numerals designate the same or comparable components.

Figure 1:
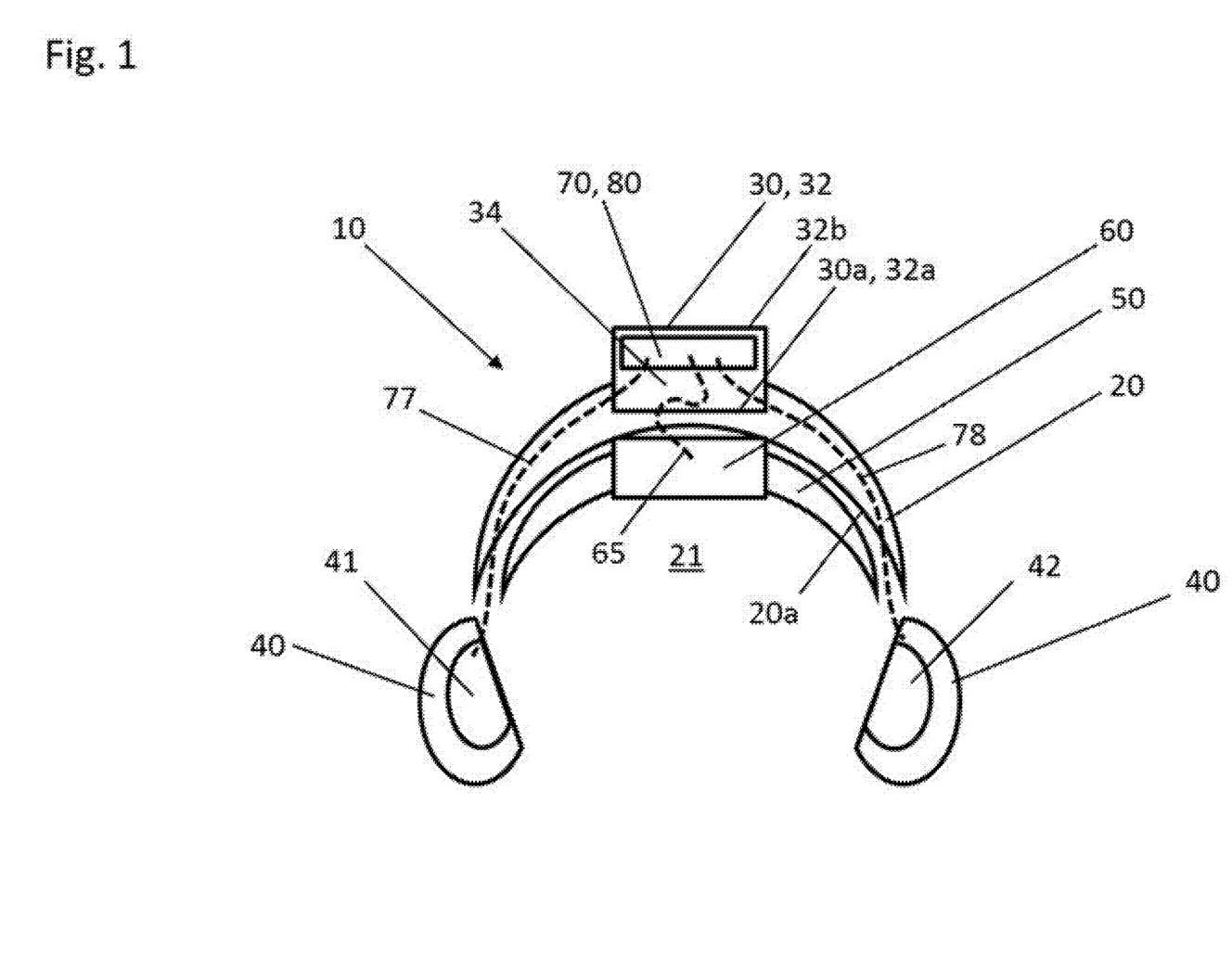
FIG. 1 shows a schematic cross-sectional front view of a protective helmet according to the invention.

To give an overview of the entire helmet communication system, a protective helmet 10 comprising a helmet shell 20, a helmet shell attachment 30 attached to the helmet shell 20 and a hearing protector 40 also attached to the helmet shell 20 is schematically shown in FIG. 1. The helmet shell attachment 30 is detachably attached to the outer surface of the helmet shell 20 and forms a housing 32 for a fitting space 34 disposed between the helmet shell 20 and the helmet shell attachment 30 together with the helmet shell 20, the helmet shell 20 forming an inner wall 32a of the housing 32, and the helmet shell attachment 30 forming an outer wall 32b of the housing. The hearing protector 40 comprises a right ear protection cavity 41 and a left ear protection cavity 42. In an interior 21 of the helmet shell 20, the protective helmet 10 further comprises a supporting cage 50 consisting of a softer material than the helmet shell 20 to improve the wearing comfort of the protective helmet and to suppress blows. In the centre of supporting cage 50, a microphone 60 for capturing and receiving sound waves is provided. The microphone 60 can, in particular, capture spoken sounds from a wearer of the protective helmet 10 the sound waves of which propagate above a head 1 of the wearer. The head 1 is only shown in FIGS. 5 to 8 for the sake of a better overview. The position of the microphone 60 is, in this case, above a connecting line between the coronal and the parietal bone because spoken words of the person wearing the protective helmet 10 can be particularly clearly captured in this position.

In the fitting space 34, a loudspeaker device 70 as well as an electronic device 80 for communicating are disposed. The loudspeaker device 70 converts electric signals transmitted by the electronic device 80 into acoustic signals to be transmitted to the hearing protector 40. Between the loudspeaker device 70 and the hearing protector 40, i.e. the right ear protection cavity 41 and the left ear protection cavity 42, an acoustic line 77, 78 formed as a tube of elastic silicone for transmitting the air-borne sound waves generated by the loudspeaker device 70 is provided, respectively. The thus formed acoustic line has a uniform cross section along its route to expose the acoustic signal to as few interferences as possible. The sound waves entering the hearing protection cavities 41, 42 can be heard well by a person wearing the protective helmet 10. The loudspeaker device 70, the acoustic lines 77, 78, and the hearing protector 40 form an acoustic helmet communication system for transmitting sound waves to the ear of the person wearing the helmet.

Figure 2:
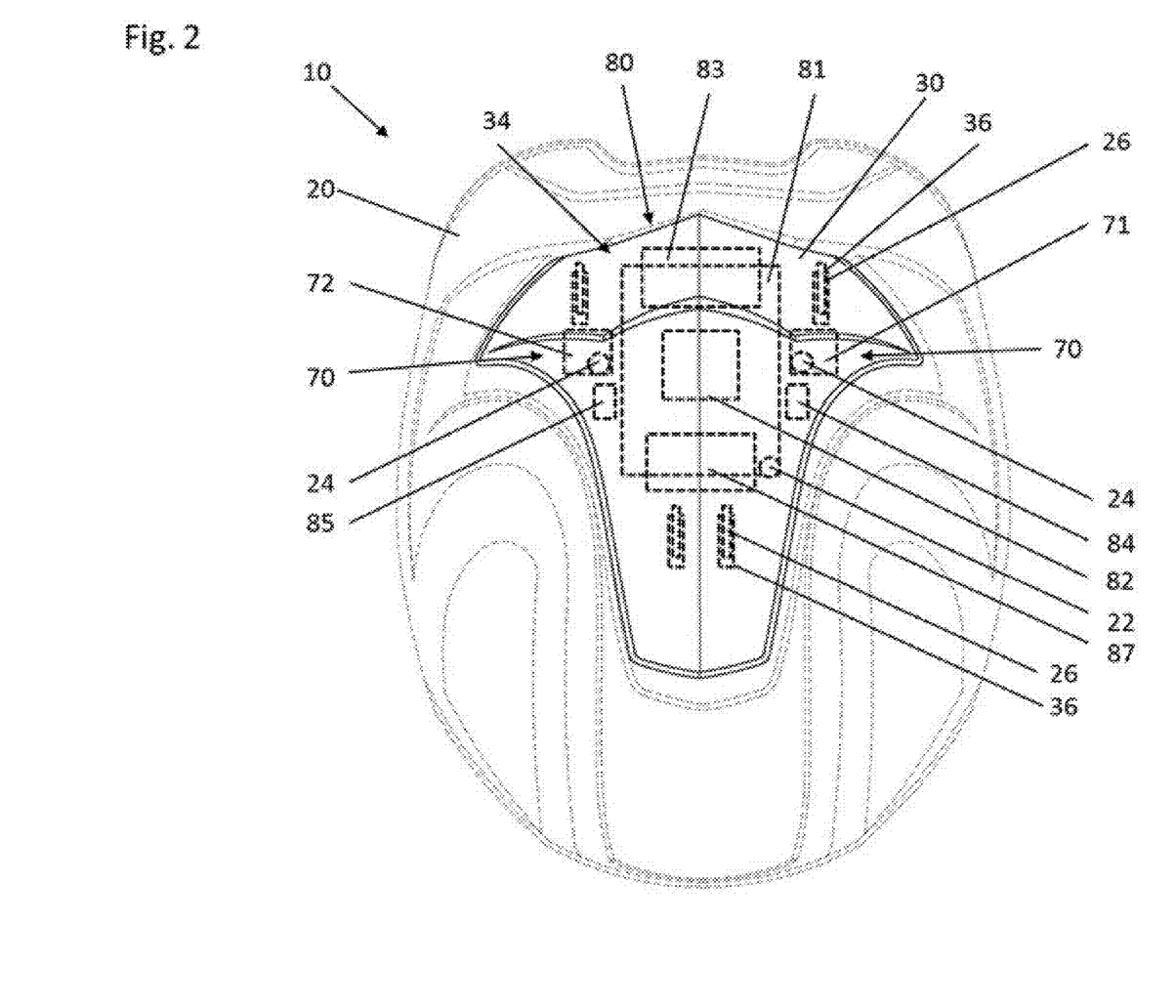
FIG. 2 shows a plan view of an embodiment of a protective helmet according to the invention.

In FIG. 2, a plan view of an embodiment of a protective helmet 10 is shown. The helmet shell 20 is indicated by a broken line, the helmet shell attachment 30 is indicated by a continuous line. The smaller elements indicated by broken lines are the individual components of the loudspeaker device 70 and of the electronic device 80 as well as connecting means 26, 36 provided for attaching the helmet shell attachment 30 to the helmet shell 20. The connecting means 26, 36 are latching arms 36 protruding downwards from the helmet shell attachment 30, i.e. into the graphic plane, and accommodation slots 26 formed in the helmet shell 20. The latching arms 36 may be inserted into the associated accommodation slots 26 in the helmet shell 20 and latched therein. In this way, the helmet shell attachment 30 is immobilised on the helmet shell 20, and the helmet shell 20 and the helmet shell attachment 30 form the housing 32 for the fitting space 34 in which the loudspeaker device 70 and the electronic device 80 are mounted. The loudspeaker device 70 and the electronic device 80 are mounted on and fixed to the helmet shell attachment 30 from below. The helmet shell attachment 30 is freely accessible from below in a non-attached state to enable an installation, exchange or repair of the components of the loudspeaker device 70 and of the electronic device 80. Due to the fact that the helmet shell attachment 30 can be mounted on the helmet shell 20 together with the loudspeaker and electronic device 70, 80 an existing protective helmet may be retrofit in a simple manner.

In the present embodiment, the loudspeaker device 70 is comprised of two loudspeakers 71, 72 laterally installed in the fitting space 34 and spatially separated from each other. The loudspeakers 71, 72 are schematically indicated by bolder broken lines. Owing to the spatially separated arrangement of the loudspeakers 71, 72, an independent acoustic signal for the left ear protection cavity 41 and an acoustic signal for the right ear protection cavity 42 can be generated, respectively. For transmitting the acoustic signals generated by the loudspeaker device 70 and the electric signals generated or captured by the electronic device 80, ventilation channels already existing in the helmet shell 20 may be used as a tube guiding channel 22 or as a cable guiding channel 24. Incidentally, the acoustic line 77, 78 connected to the loudspeaker device 70 the output of which ends in the associated ear protection cavity 41, 42 is lead through the tube guiding channel 22. A signal connection 65 extending from the electronic device 80 to the microphone 60 is lead through the cable guiding channel 24. The signal connection 65 is an electric line 65. The acoustic and the electric lines 77, 78, 65 are shown in FIG. 1 and not shown in FIG. 2 for the sake of a clearer illustration.

The electronic device 80 shown in FIG. 2 comprises a plurality of individual electronic components 81 to 87 also schematically indicated by bolder broken lines. In the present embodiment, the electronic device 80 comprises a circuit board 81 including electronic conductor paths for a facilitated connection of the remaining electronic components and for avoiding a plurality of cables between the electronic components, whereby friction between the components and the cables is avoided, and less structure-borne sound waves are generated. It further comprises a signal processing unit 82 formed as a processor or integrated circuit, an accumulator 83 serving as a voltage source, a signal receiver formed as a radio receiver 84, as well as a signal transmitter formed as a radio transmitters 85 to be capable of communicating with the surroundings, for example, with a mobile communications network or with devices suitable for Bluetooth by radio transmission. In addition, a signal amplifier 87 to which the electric line 65 is connected and which receives, amplifies, and forwards the per se weak electric signal from the microphone 60 to the signal processing unit 82 is disposed on the circuit board 81.

The signal processing unit 82 and the accumulator 83 are plugged onto the circuit board 81. The radio receiver 84 and the radio transmitter 85 are laterally tethered to the circuit board 81. The radio signals captured by the radio receiver 84 are transmitted to the signal processing unit 82, the signal processing unit 82 being electronically connected to the loudspeakers 71, 72 and to the microphone 60 via the signal amplifier 87.

In a modified embodiment, the helmet shell attachment 30 may comprise another wall formed as a connecting wall 30a towards the bottom side, the connecting means 26 being disposed on the connecting wall 30a below, i.e. facing, the helmet shell 20. The connecting wall 30a is indicated in the schematically illustrated FIG. 1 for clarification purposes. In this case, the helmet shell attachment 30 alone forms the housing 32 for the fitting space 34 so that all components of the loudspeaker device 70 and of the electronic device 80 are disposed in the helmet shell attachment 30 forming the housing 32 separately and in a protected manner. In the connecting wall 30a, openings corresponding to existing passages in the helmet shell 20 are provided so that the lines 43, 44, 65 can be lead to the area below the protective helmet 10.

In any case, the connecting means 26, 36 renders a simple and safe exchange of helmet shell attachments 30 possible, for example the replacement of an existing helmet shell attachment without a loudspeaker and electronic device by a helmet shell attachment 30 including the loudspeaker and electronic device 70, 80. In particular, it may be contemplated that the acoustic lines 77, 78 are simply inserted into in the tube guiding channel 24 from an inner surface 20a of the helmet shell 20, the loudspeakers 71, 72 comprising loudspeakers outputs positioned so that tubes inserted from below can be connected without being bent.

Figure 3:
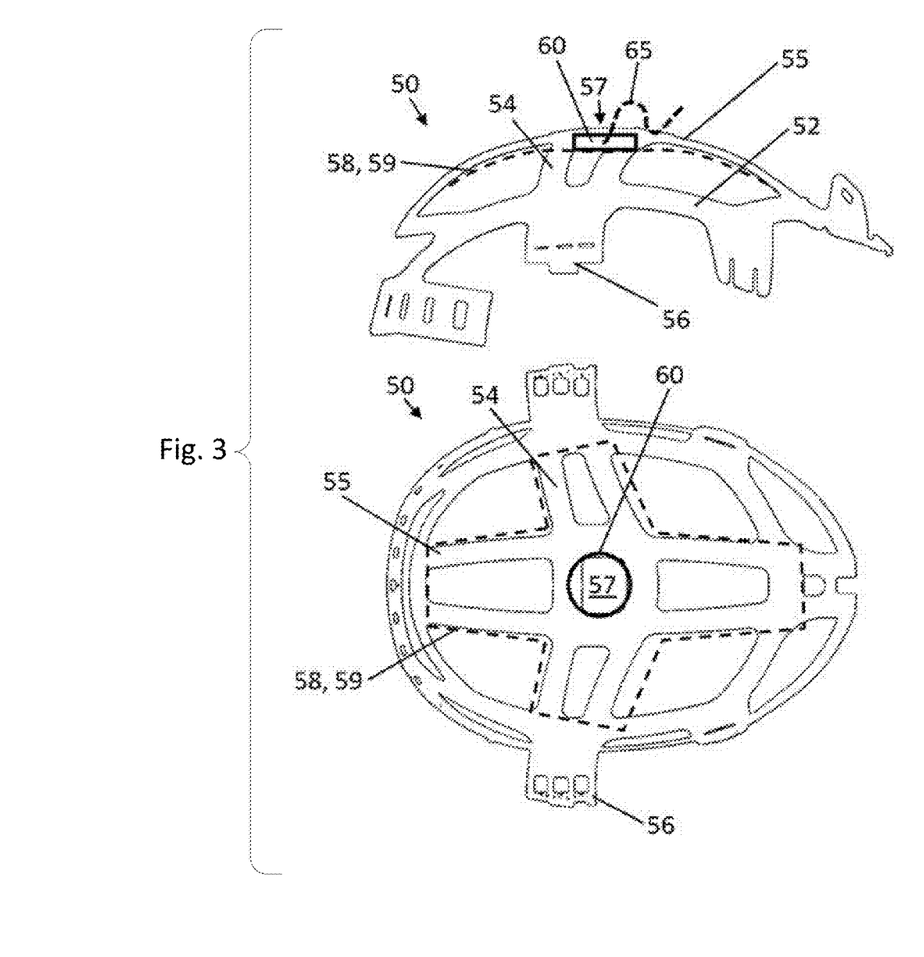
FIG. 3 shows a schematic view of a supporting cage of a protective helmet according to the invention comprising a microphone.

In FIG. 3, the outline of an embodiment of the supporting cage 50 is shown in a side view and in a plan view, the microphone 60 being disposed on the supporting cage 50. At the same time, the supporting cage comprises support ribs 52 for an abutment on the head 1 of the wearer of the helmet on the level of the forehead, and support ribs 54, 55 for an abutment on the head 1 of the wearer. The support ribs 54, 55 respectively comprise two transverse ribs 54 and two longitudinal ribs 55 which are disposed crosswise in the shape of a rhomb. The microphone 60 is attached to the support ribs 54, 55 from below and protrudes into the interior of the supporting cage 50. For fastening the supporting cage 50 on the helmet shell 20 fastening means 56 are provided in a lateral section of the protective helmet 10. To render the lining of the protective helmet 10 more comfortable a pad 58, 59 contacting the head surface below the support ribs 54, 55 is provided on the inner surface of the supporting cage. The microphone 60 is located between the support ribs 54, 55 and the pad 58, 59 so that the lining of the microphone 60 on the head surface is also cushioned. Since the support ribs 54, 55 are arranged in the form of a rhomb the microphone 60 can be disposed partly in the centre of the supporting cage 50 between the individual support ribs 54, 55, the electric line 65 extending upwards through a central opening 57.

Figure 4:
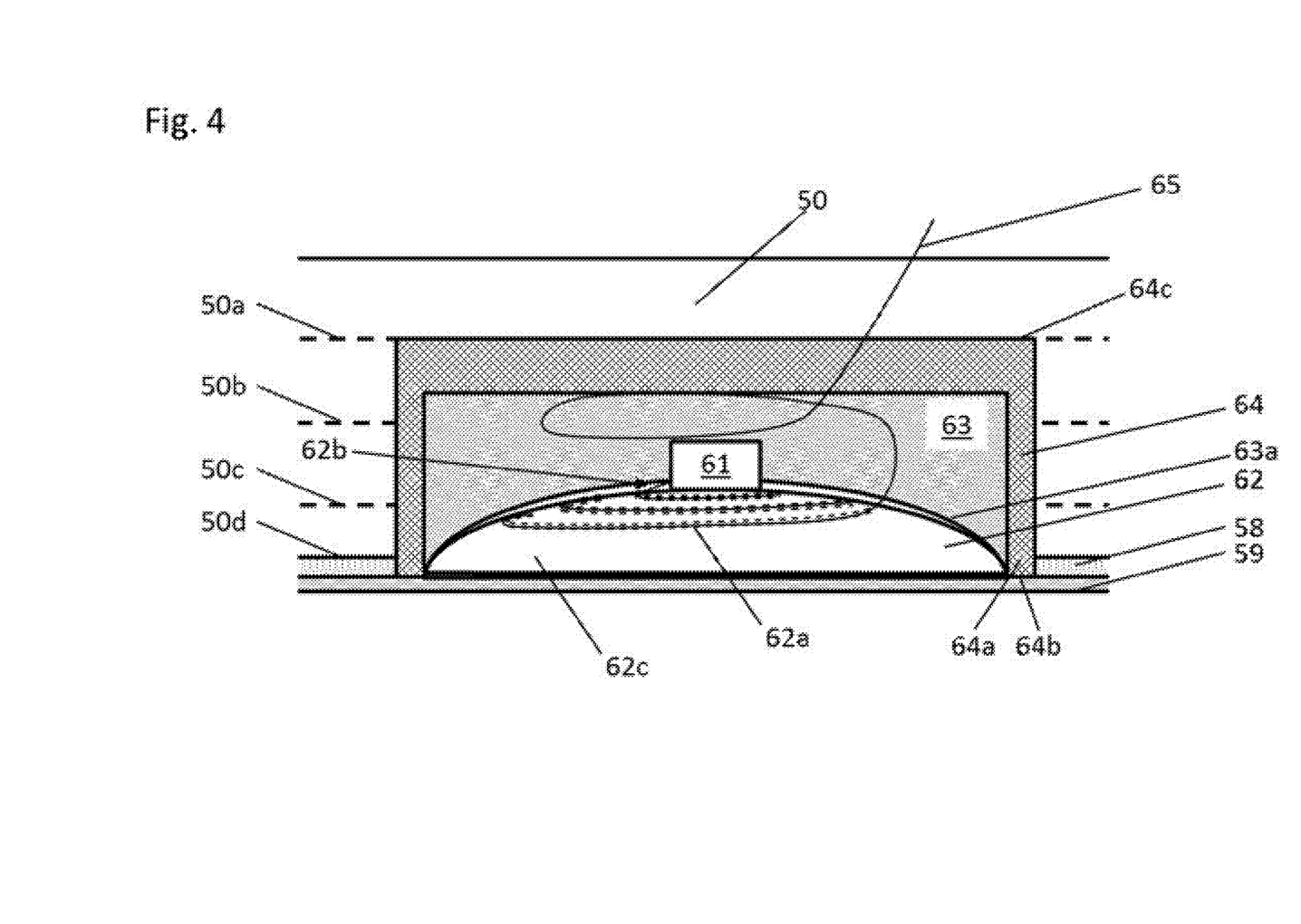
FIG. 4 shows a section of the supporting cage shown in FIG. 3 including the microphone illustrated in more detail.

In FIG. 4, a more detailed representation of the arrangement of the microphone 60 on the supporting cage 50 is shown. The microphone 60 has a cylindrical form. The microphone 60 comprises a piezoelectric sensor 61, a funnel-shaped sound receiver 62 provided with a concave curvature facing the head, and an airborne sound absorber 63 consisting of foamed material and arranged for accommodating the sensor 61 and the sound receiver 62 in the microphone. A large part of the air-borne sound waves reaching the microphone 60 from the outside is absorbed by the foamed material. Furthermore, the microphone 60 comprises a cup-shaped structure-borne sound absorber 64 made of rubber which surrounds the other components 61 to 63 and connects the microphone 60 to the supporting cage 50, particularly its transverse ribs 54 and its longitudinal ribs 55. In the present embodiment, the structure-borne sound absorber 64 is the only component of the microphone 60 which is physically directly connected to the supporting cage which means that the other components of the microphone 60 are shielded from the structure-borne sound waves transmitted by the support body 50. Rubber is an elastomer excellently absorbing the structure-borne sound waves transferred to the microphone 60 by the supporting cage 50 without said sound waves being transmitted to the sound receiver 62. The sound receiver 62 comprises a cable channel 62a indicated by a broken double line which extends helically from a central area 62b toward the outside while running around the sound receiver 62. Incidentally, the cable channel 62a is formed on an outer surface 62c facing the airborne sound absorber 63. In the cable channel 62a, the electric line 65 originating from the sensor 61 and connected to the electronic device 80 is disposed which also extends helically or approximately spirally in a section of the electric line 65 passing through the airborne sound absorber 63 in the airborne sound absorber 63 in an outer section. The electric line 65 is, at the same time, lead up to the structure-borne sound absorber 64 and passes through it, extends along the inner surface of the helmet shell 20 up to the cable guiding channel 24, enters the fitting space 34 there, and is connected to the electronic device 80 in the fitting space 34. A major proportion of the structure-borne sound waves transmitted by the protective helmet 10 via the electric line 65 is absorbed without reaching the sensor 61 by the swimming mount of the electric line 65 in the airborne sound absorber 63 as well as the extensive abutment on the sound receiver 62. In this way, only the spoken words of the wearer of the helmet are captured by the sensor 61.

In the present embodiment, the sound receiver 62 consists of wood; it may, however, also be made of a plastic material or metal.

For the abutment of the microphone 60 on the head 1 and for excluding air-borne sound waves the microphone 60 abuts on a protrusion 64a of the structure-borne sound absorber 64 with a contact surface 64b as well as on the head 1 of the wearer of the helmet with the sound receiver 62. In the present embodiment, the contact surface 64b of the structure-borne sound absorber 64 is designed so as to be circular, head hair also being compressed so that an airtight and soundproof contact of the microphone 60 on the head 1 is possible. In this way, interfering noise reaching the microphone 60 via the head 1 or the air from the outside is absorbed so that the sensor 61 can work unimpeded. To enable a transmission of the sound waves from the wearer of the helmet to the sound receiver 62 on the head, the edges of the sound receiver 62 facing the head 1 are arranged plane-parallel with respect to the contact surface 64b, the shape of the sound receiver 62 being adapted to the shape of the head which, in the present case, results in the funnel-shaped form of the sound receiver 62. In this way an abutment of the sound receiver 62 on the head is facilitated, an average head shape being taken as a basis. Further, the airborne sound absorber 63 comprises a recess forming a support surface 63a for the sound receiver 62 which is complementary to the funnel-shaped upper wall surface or the outer surface 62c of the sound receiver 62 so that the sound receiver 62 can abut on the airborne sound absorber 63. In this way, the absorption of interfering noise by the airborne sound absorber 63 is achieved and an altogether improved interfering noise absorption is obtained.

The pad 58, 59 disposed on the lower surface of the supporting cage 50 is also disposed between the head 1 and the contact surface 64b of the structure-borne sound absorber 64 or extends there and is also compressed there to prevent air-borne sound waves from reaching the interior and thus the sensor 61 of the microphone 60 from the outside.

The pad may be divided into a plurality of pad sections 58, 59, wherein, for example, only one inner pad 59 needs to extend below the microphone 60.

The microphone 60 is not necessarily arranged in or at one level with the supporting cage 50 but may be attached to a lower side of the supporting cage 50 with an upper side 64c of the structure-borne sound absorber 64. To this end, for example, an adhesive connection or a hook-and-loop fastener may be provided, particularly to provide for a detachable connection between the microphone 60 and the supporting cage 50. In FIG. 4, different arrangement positions 50a to 50d of the upper side 64c of the structure-borne sound absorber 64 and thus of the microphone 60 are depicted. The supporting cage 50 comprises a corresponding or no recess for accommodating and/or contacting the microphone 60.

In FIGS. 5 to 8 which will be described in the following and which respectively show the protective helmet 10 in a cross-sectional front view, different embodiments of acoustic systems on the protective helmet 10 are described, particularly the arrangement of loudspeakers 71, 72 of the loudspeaker device 70 in the fitting space 34 in relation to the arrangement of the microphone 60, but also the transmission paths of the acoustic signals of the loudspeakers 71, 72 to the hearing protection cavities 41, 42. Each of the loudspeakers 71, 72 comprises a membrane 73, 74 dividing an inner chamber 75, 76 of each of the loudspeakers 71, 72 into a first chamber 75a, 76a on the output side and a second, rear chamber 75b, 76b. The respective two chambers are separated from each other in an airtight manner by the membrane 73, 74. The acoustic lines 77, 78 formed as silicone tubes are lead out of the chambers 75a, 76a on the output side through exit openings formed complementary to the tubes. In the following, the exit openings will be referred to as acoustic outlets 79. It may be contemplated that the tubes may be inserted into a plug-in accommodation provided for this purpose from the inner surface of the helmet shell to be retained there. The one or more acoustic outlets 79 of the one or more loudspeakers 71, 72 and the acoustic inlets 49 of the hearing protection cavities 41, 42 are schematically indicated by arrows.

Figure 5:
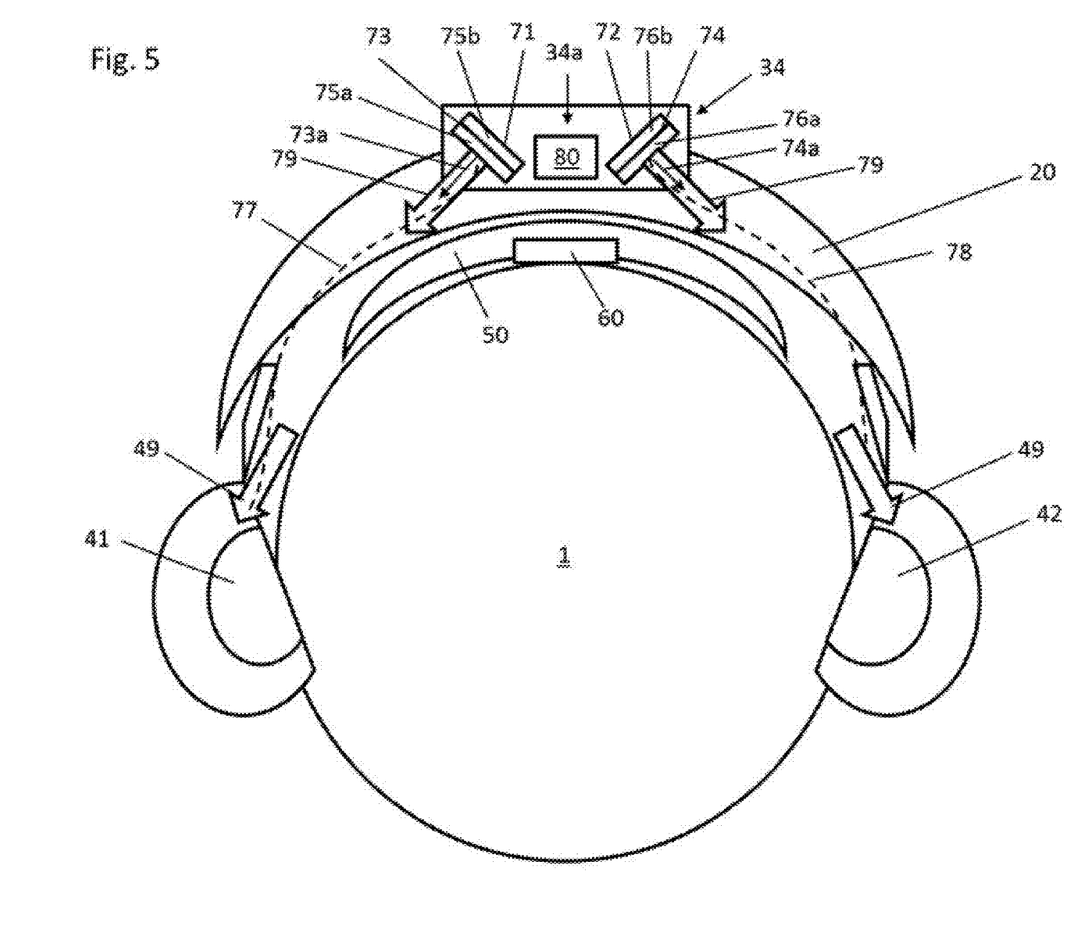
FIG. 5 shows a schematic representation of a first embodiment of an acoustic helmet communication system.

In FIG. 5, the loudspeakers 71, 72 are angularly mounted in the fitting space 34 so that the extension of a surface normal 73*a*, 74*a* of the respective membrane 73, 74 leads past the microphone 60. For definition purposes, the surface normal is assumed to be a membrane at rest. It has turned out that such an arrangement in the microphone 60 causes substantially less severe acoustic interferences than an arrangement of the loudspeakers 71, 72 in which the surface normals 73*a*, 74*a* of the associated membranes 73, 74 intersect the space occupied by the microphone 60. This arrangement is characterised both by a reduced impairment of the microphone 60 and by a flat fitting space 34. In particular, a main emanating direction of the loudspeakers 71, 72 is defined by a directional vector averaged across all surface normals of a membrane 73, 74, wherein, in particular, the main emanating direction leads past the space occupied by the microphone 60. The first, right loudspeaker 71 is separated from the second, left loudspeaker 72 by an intermediate space 34*a* in which, in the present embodiment, at least part of the electronic device 80 is disposed. With the intermediate space 34*a*, it is advantageously avoided that the signal of the right loudspeaker 71 is also transmitted to the left acoustic line 78 which is connected to the left loudspeaker 72 on the output side and causes an interference, for example a resonance, there, and vice versa. The intermediate space 34*a* may, for example, additionally be filled with another sound absorber to further reduce any mutual interference of the two loudspeakers.

Figure 6:
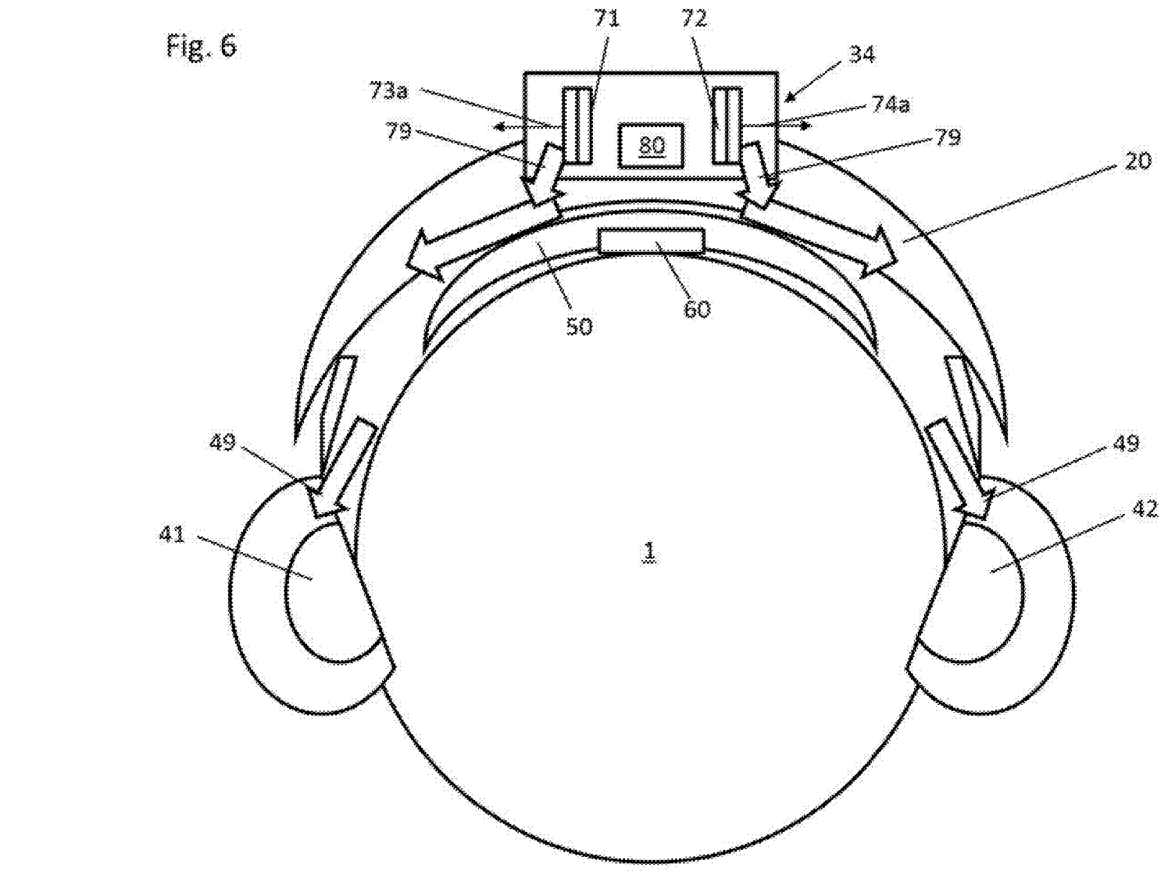
FIG. 6 shows a schematic representation of a second embodiment of an acoustic helmet communication system.

In the second embodiment of the acoustic system shown in FIG. 6, an alternative mounting technique of the loudspeakers 71, 72 is illustrated, wherein the surface normals 73*a*, 74*a* of the respective membranes 73, 74 are directed toward the outside in opposite directions and extend in parallel to a tangent abutting on a vertex of the helmet shell 20. This arrangement generates the least impairment of the microphone 60.

Figure 7:
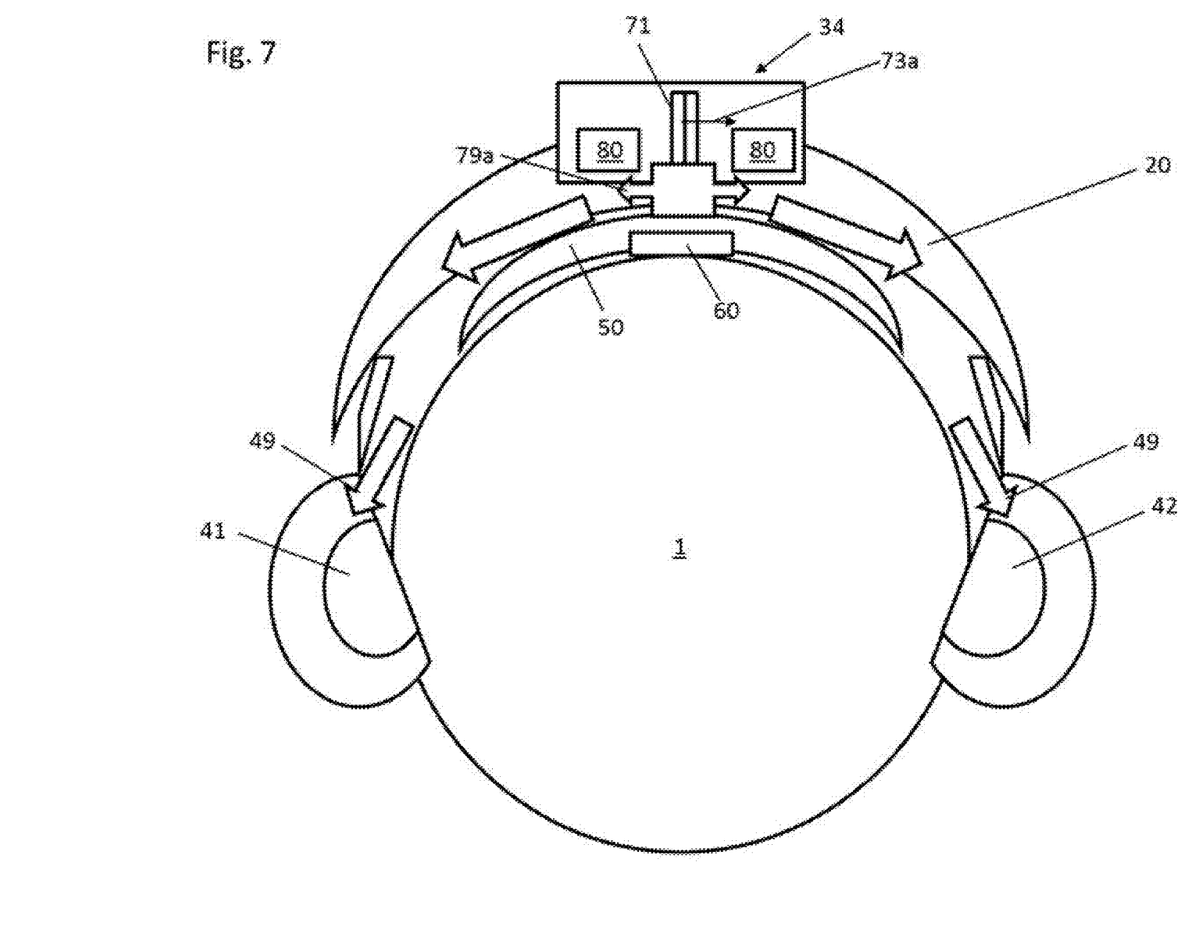
FIG. 7 shows a schematic representation of a third embodiment of an acoustic helmet communication system.

In FIG. 7, a third embodiment of an acoustic system is shown, wherein only a single loudspeaker 71 is disposed in the fitting space 34. The membrane 73 of the loudspeaker 71 has a surface normal 73*a* extending in parallel to a tangent abutting on a vertex of the helmet shell 20. An acoustic signal splitting element 79*a* splitting the acoustic signals generated by the loudspeaker and routing them to the associated hearing protection cavities 46, 47 via the acoustic lines 77, 78, respectively, is connected to the outlet opening of the first chamber 75*a*.

Figure 8:
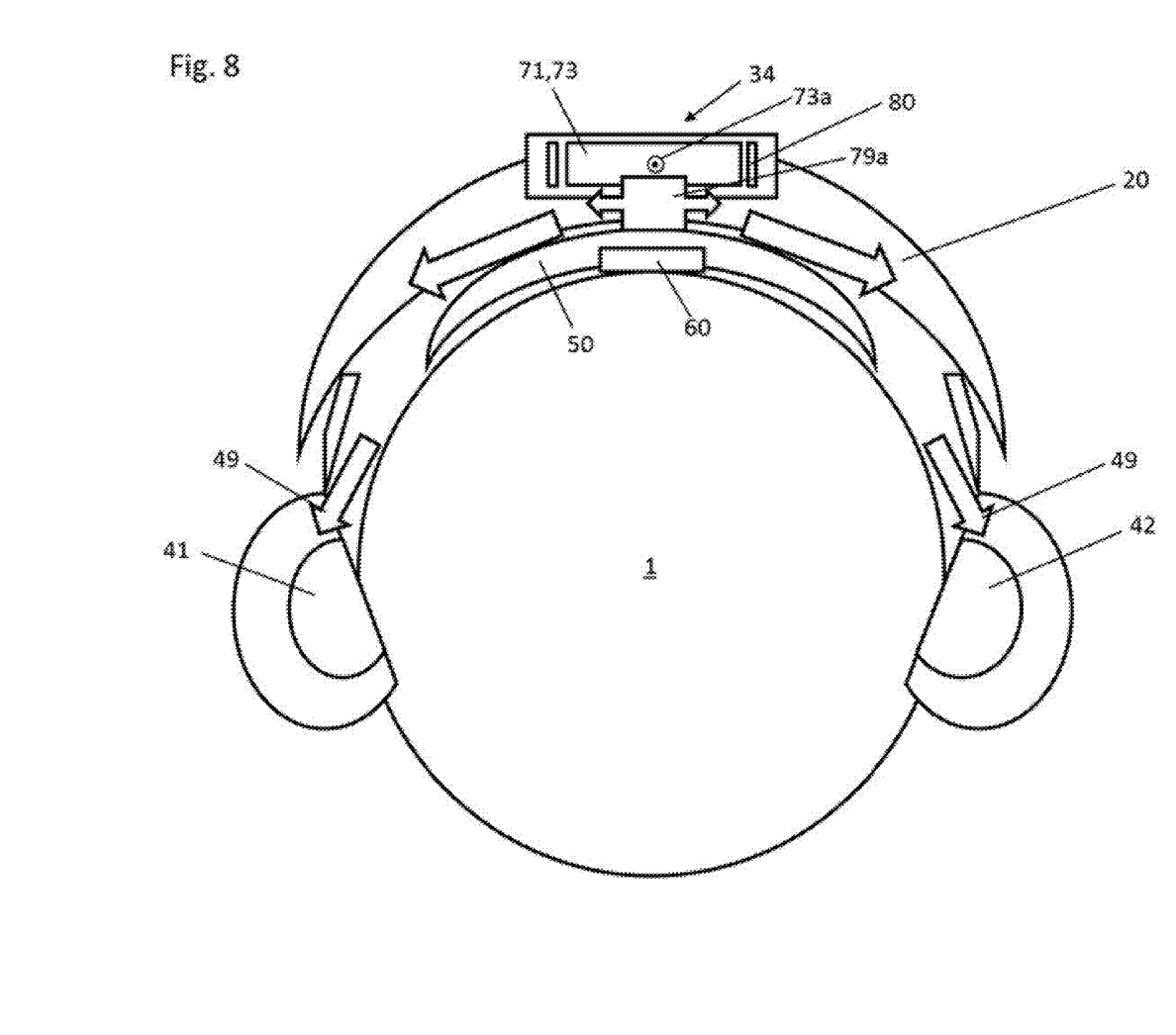
FIG. 8 shows a schematic representation of a fourth embodiment of an acoustic helmet communication system.

In FIG. 8, another embodiment of the acoustic system is shown in which again a single first loudspeaker 71 is shown. A second loudspeaker (not shown) may be disposed behind the first loudspeaker 71 facing in an opposite direction. The surface normal 73*a* of the membrane 73 of the loudspeaker 71 is directed out of the drawing which is indicated by a circle with a dot. The sound waves guided forwards in this way are guided to an acoustic signal splitting element 79 guiding the sound waves to the respective ear protection cavity 46, 47 via the acoustic lines 44, 45, respectively, through the outlet opening.

In the cases with two loudspeakers 71, 72, both loudspeakers 71, 72 may have a surface normal 73*a*, 74*a* of the membrane 73, 74 which is directed towards the front or rear or has a directional component facing forwards or backwards.

The features of the invention disclosed in the above description, in the drawings as well as in the claims may be important for the implementation of the invention both individually and in any combination.

LIST OF NUMERALS

- 10 protective helmet
- 20 helmet shell
- 20*a* inner surface of the helmet shell
- 21 interior of the helmet shell
- 22 tube guiding channel
- 24 cable guidance channels
- 26 accommodation slots, connecting means
- 30 helmet shell attachment
- 32 housing
- 32*a* inner wall of the housing
- 32*b* outer wall of the housing
- 34 fitting space
- 34*a* intermediate space
- 36 latching arms, connecting means
- 40 hearing protector
- 41 right ear protection cavity
- 42 left ear protection cavity
- 50 supporting cage
- 50*a* contact positions
- 50*b* contact positions
- 50*c* contact positions
- 50*d* contact positions
- 52 support ribs
- 54 transverse ribs
- 55 longitudinal ribs
- 56 fastening means
- 57 central opening
- 58 pad area, pad
- 59 pad area, pad, inner pad
- 60 microphone
- 61 sensor
- 62 sound receiver
- 62*a* cable channel
- 62*b* central area
- 62*c* outer surface
- 63 airborne sound absorber
- 63*a* support surface
- 64 structure-borne sound absorber
- 64*a* protrusion
- 64*b* contact surface
- 64*c* upper side
- 65 electric line, signal connection
- 70 loudspeaker device
- 71 right loudspeaker
- 72 left loudspeaker
- 73 membrane
- 73*a* surface normal
- 74 membrane
- 74*a* surface normal
- 75 inner chamber
- 75*a* first chamber on the output side
- 75*b* second rear chamber
- 76 inner chamber
- 76*a* first chamber on the output side
- 76*b* second, rear chamber
- 77 right acoustic line
- 78 left acoustic line
- 79 acoustic outlet
- 79*a* acoustic signal splitting element
- 80 electronic device
- 81 circuit board
- 82 signal processing unit 83 voltage source, accumulator
84 signal receiver, radio receivers
85 signal transmitter, radio transmitters
87 signal amplifier

What is claimed is:

1. A protective helmet for a user, the protective helmet comprising:
   a helmet shell defining an interior space;
   a housing enclosing a fitting space disposed on an outside of the helmet shell;
   a supporting cage disposed in the interior space;
   an electronic device disposed in the fitting space, the electronic device for communicating by the user to a second party;
   a microphone disposed in or on the supporting cage, the microphone comprising
      a sensor for electronically detecting sound waves made by the user,
      a sound receiver for capturing and for transmitting the sound waves to the sensor and propagating the sound waves above a head of the user; and
   a signal connection connecting the microphone to the electronic device, the signal connection for transmitting the sound waves as a signal to the electronic device,
   wherein the microphone comprises an airborne sound absorber for suppressing air-borne sound waves transmitted to the microphone through ambient air.

2. The protective helmet according to claim 1, wherein the sensor is a piezoelectric sensor.

3. The protective helmet according to claim 1, wherein the sound receiver comprises a funnel shape, and the sensor is disposed in a central section of the funnel shape.

4. The protective helmet according to claim 1, wherein the sound receiver comprises a concave curvature facing a head surface of the head of the user.

5. The protective helmet according to claim 1, wherein the airborne sound absorber comprises a foamed material.

6. The protective helmet according to claim 1, wherein the airborne sound absorber comprises a support surface for the sound receiver, the support surface comprising a shape complementary to the sound receiver.

7. The protective helmet according to claim 1, wherein the electronic device comprises a circuit board, a signal processing unit, a voltage source, a signal receiver, a signal transmitter or a signal amplifier.

8. The protective helmet according to claim 7, further comprising a helmet shell attachment connected to the helmet shell from the outside of the helmet shell, the helmet shell forming at least part of the housing.

9. The protective helmet according to claim 1, wherein the signal connection is an electric line.

10. The protective helmet according to claim 9, wherein the electric line comprises a helical section, the helical section extending within the airborne sound absorber.

11. The protective helmet according to claim 9,
    wherein the sound receiver comprises a cable channel, and
    wherein the electric line comprises a section guided within the cable channel.

12. The protective helmet according to claim 11, wherein the cable channel extends helically within the sound receiver.

13. A protective helmet for a user, the protective helmet comprising:
    a helmet shell defining an interior space;
    a housing enclosing a fitting space disposed on an outside of the helmet shell;
    a supporting cage disposed in the interior space;
    an electronic device disposed in the fitting space, the electronic device for communicating by the user to a second party;
    a microphone disposed in or on the supporting cage, the microphone comprising
       a sensor for electronically detecting sound waves made by the user,
       a sound receiver for capturing and for transmitting the sound waves to the sensor and propagating the sound waves above a head of the user; and
    a signal connection connecting the microphone to the electronic device, the signal connection for transmitting the sound waves as a signal to the electronic device;
    wherein the signal connection is an electric line;
    wherein the electric line comprises a helical section, the helical section extending within the airborne sound absorber.

14. A protective helmet for a user, the protective helmet comprising:
    a helmet shell defining an interior space;
    a housing enclosing a fitting space disposed on an outside of the helmet shell;
    a supporting cage disposed in the interior space;
    an electronic device disposed in the fitting space, the electronic device for communicating by the user to a second party;
    a microphone disposed in or on the supporting cage, the microphone comprising
       a sensor for electronically detecting sound waves made by the user,
       a sound receiver for capturing and for transmitting the sound waves to the sensor and propagating the sound waves above a head of the user; and
    a signal connection connecting the microphone to the electronic device, the signal connection for transmitting the sound waves as a signal to the electronic device;
    wherein the signal connection is an electric line;
    wherein the sound receiver comprises a cable channel, and
    wherein the electric line comprises a section guided within the cable channel; and
    wherein the cable channel extends helically within the sound receiver.

* * * * *